PROTECTIVE MASK AND HALTER APPARATUS

(12) United States Patent
Pressler et al.

(10) Patent No.: US 7,624,558 B2
(45) Date of Patent: Dec. 1, 2009

(54) PROTECTIVE MASK AND HALTER APPARATUS

(76) Inventors: Denise Kathleen Pressler, P.O. Box 644, Bethel Island, CA (US) 94511; Kurt Terry Pressler, P.O. Box 644, Bethel Island, CA (US) 94511

( * ) Notice: Subject to any disclaimer, the term of this patent is extended or adjusted under 35 U.S.C. 154(b) by 0 days.

(21) Appl. No.: 12/215,754

(22) Filed: Jun. 30, 2008

(65) Prior Publication Data

US 2009/0241856 A1 Oct. 1, 2009

Related U.S. Application Data

(60) Provisional application No. 61/065,653, filed on Feb. 14, 2008.

(51) Int. Cl.
*B68B 7/00* (2006.01)
*B68C 5/00* (2006.01)
*A01K 13/00* (2006.01)

(52) U.S. Cl. .......................... 54/80.5; 54/80.1; 119/850

(58) Field of Classification Search .................. 54/80.1, 54/80.2, 80.4, 80.5; 119/856, 863, 865, 850
See application file for complete search history.

(56) References Cited

U.S. PATENT DOCUMENTS

| 4,581,877 A | * | 4/1986 | Wilber | 54/80.2 |
| 5,345,751 A | * | 9/1994 | Edwards | 54/80.2 |
| 6,128,891 A | * | 10/2000 | McMahon | 54/80.1 |
| 6,216,642 B1 | * | 4/2001 | Hung | 119/850 |
| 2004/0159083 A1 | * | 8/2004 | Andrews | 54/80.5 |
| 2004/0244342 A1 | * | 12/2004 | Grogoza et al. | 54/79.4 |
| 2007/0169444 A1 | * | 7/2007 | Hung | 54/80.4 |

* cited by examiner

*Primary Examiner*—Son T. Nguyen
(74) *Attorney, Agent, or Firm*—Thomas R. Lampe

(57) ABSTRACT

Protective mask and halter apparatus for protecting the head and eyes of a horse or other animal from insects and the sun includes a cap formed of mesh material and a halter including strapping attached to the cap and a closure for maintaining the cap in position on the animals head, the mesh material being colored and marked to conform to typical animal coloring and marking.

8 Claims, 3 Drawing Sheets

PROTECTIVE MASK AND HALTER APPARATUS

This Application is based on and claims the benefit of U.S. Provisional Patent Application No. 61/065,653; Filed: Feb. 14, 2008.

TECHNICAL FIELD

This invention relates to protective mask and halter apparatus for protecting the head and eyes of a horse or other animal from insects and the sun. More particularly, the present invention relates to apparatus configured not only to provide insect and sun protection, but also to function as a halter for capturing and controlling the animal. The apparatus has particular, but not exclusive, application to horses, and the apparatus presents a natural appearance, such that a horse wearing the mask will appear in a natural state pertaining to coloring and markings typical of a horse's face.

BACKGROUND OF THE INVENTION

It is known that insects and sun can cause significant irritation to horses. There are many forms of protective masks available offering varying degrees of efficacy regarding the protection of animals from insects and sun. It is further known that most devices of this field of invention involve the use in one form or another of some type of see-through mesh material installed in various ways about the anatomy of a horse's head. Many existing mask designs are of too delicate construction, resulting in short usable life. In addition, when it is desired to catch and lead a horse for whatever purpose, the existing masks must be removed, and a halter installed on the animal. This can result in losing control of the animal and reducing the safety of any persons involved in catching and leading a horse.

Additionally, horses, being naturally curious animals, tend to chew and tear at their stable mates wearing masks of typical design, that is, masks which do not present a horse in its natural state of facial colorings and markings.

DISCLOSURE OF INVENTION

The apparatus of the present invention remedies this situation by providing a protective mask with the functions of reducing irritation from insects and sun while providing a natural look to reduce damage to the mask by other horses. The apparatus further incorporates a halter which eliminates the need to remove the protective mask when catching and leading a horse, and which provides additional strength and an increase in the usable life of the mask.

The apparatus of the present invention provides an improved protective mask for a horse, said improvements being the additional function of a halter, the provision of a natural facial appearance for a horse wearing the mask, and increased durability. The apparatus provides increased mask strength as compared to commonly available masks, retains the desirable attribute of a tear-away quality for safety should a horse become caught on any object, functions as a halter of usable strength and practicality when a lead rope is attached, and, due to its natural appearance, reduces damage to the mask by other horses. These multiple, concurrent attributes do not exist in any known prior art protective mask devices for horses or other animals.

Other features, advantages and objects of the present invention will become apparent with reference to the following description and accompanying drawings.

MODES FOR CARRYING OUT THE INVENTION

Figure 1:
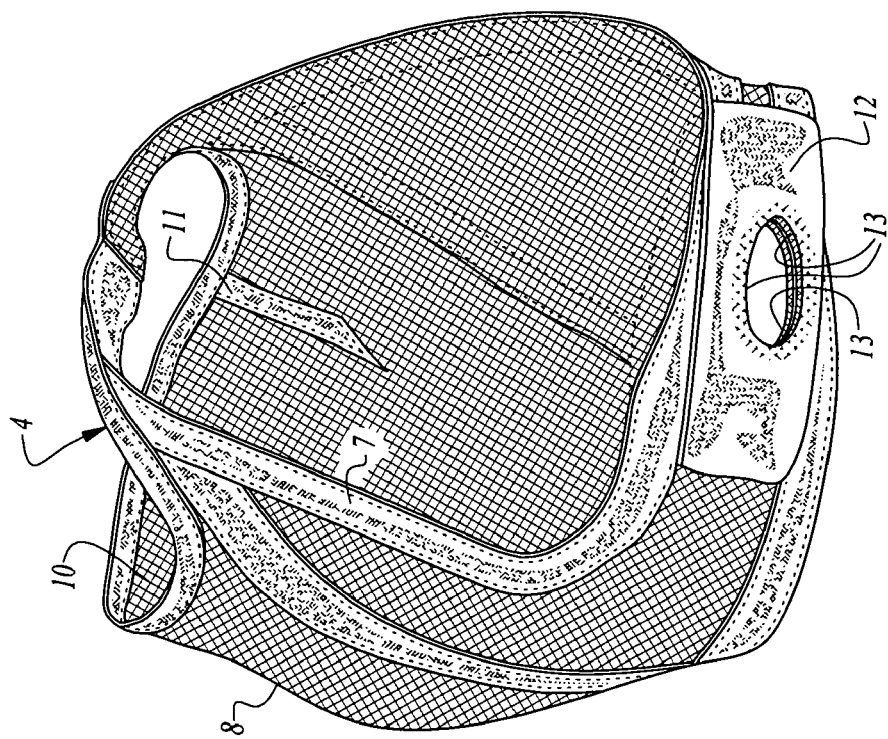
FIG. 1 is a front, perspective view of a preferred embodiment of apparatus with mask and catch halter constructed in accordance with the teachings of the present invention, illustrated in use on a horse.
Figure 3:
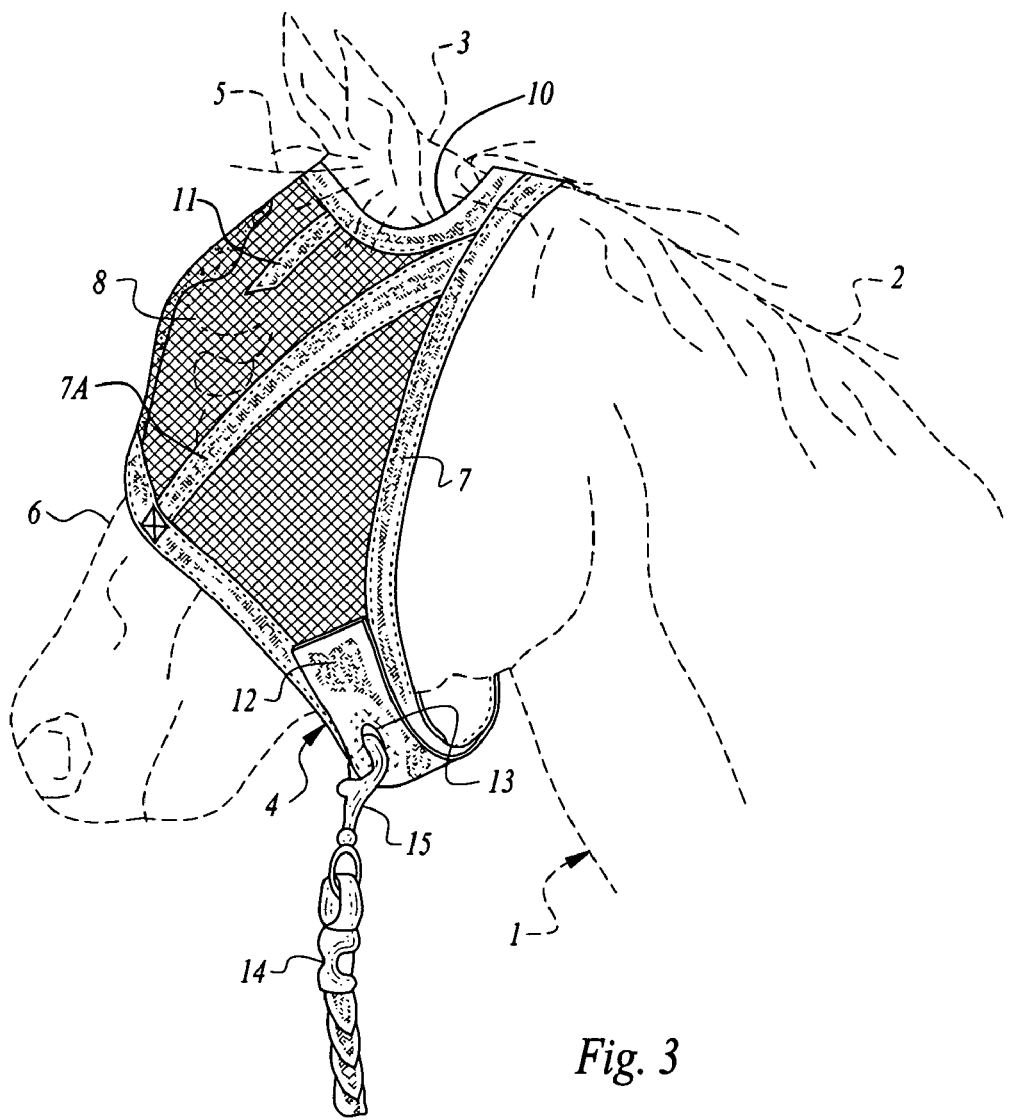
FIG. 3 is a side, perspective view of the apparatus of FIG. 1 in use on a horse as a catch halter connected to a lead rope.

Referring now to the drawings, FIGS. 1 and 3 illustrate a portion of a horse 1 including a neck 2 and head 3, both of which are necessary when utilizing the protective mask and halter apparatus 4 of the present invention. In FIG. 1, the head 3 is shown with a forelock 5 and a typical horse facial marking consisting of a blaze 6, each of interest with regard to the apparatus of the present invention. The protective mask and halter apparatus 4 is for protecting the head and eyes of the horse from insects and the sun and for capturing and controlling the horse, as will be described in greater detail below.

The apparatus includes a cap or mask 8 preferably made from one continuous piece of mesh material that is resistant to sunlight and moisture as well as being tear and puncture resistant. According to the teachings of the present invention, it is preferred that the mesh be made in one of the common colors of horses, i.e. bay, palomino, sorrel, and the like, to promote and retain a natural appearance of the horse when wearing the cap. In other words, it is preferred that the color of the cap or mask at least approximate the natural color of the horse wearing it. The cap is shaped for positioning on the horse's head.

The cap includes a centrally disposed face panel 9 bearing a marking 6A which in essence constitutes a continuation of the horse's blaze 6, both as to shape and color. Such an appearance will be much more readily accepted by other horses than conventional protective masks not incorporating these visual features.

The apparatus also includes a catch halter 7 sewn to the mesh material and utilized to stabilize and minimize shifting of the cap. The catch halter 7 may suitably be constructed of nylon or polypropylene strapping or the like and it is formed and stitched in such a manner as to provide the general appearance and design of a typical strap type halter while at the same time providing the additional strength and utility necessary for the apparatus to function not only as a protective mask, but as a catch halter. The strapping provides increased overall durability to the protective mask and halter apparatus compared to conventional protective masks for horses by helping the cap or mask maintain its shape and function in normal use. In the arrangement illustrated, the strapping includes a band 7A positionable over the cheeks of the animal whereby the overall appearance of the apparatus is similar to the appearance of an animal wearing a conventional separate halter.

An oval opening 10 through which the horse's ears and forelock fit is hemmed with material to cover raw mesh edges and prevent irritation to the animal, and sewn darts 11 are provided in the mesh material on opposed sides of the face panel for lifting the mesh material away from the animal's eyes.

Figure 2:
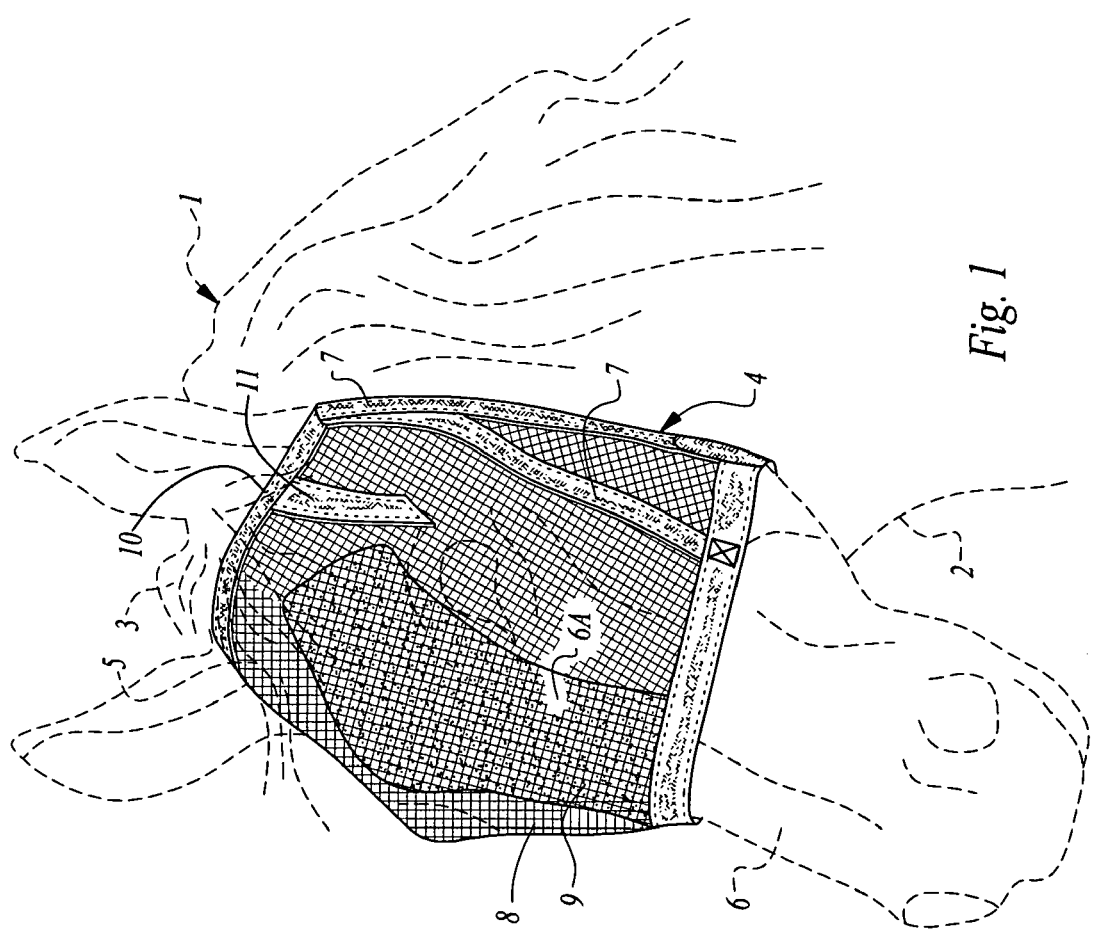
FIG. 2 is a rear, perspective view of the apparatus of FIG. 1.
Figure 4:
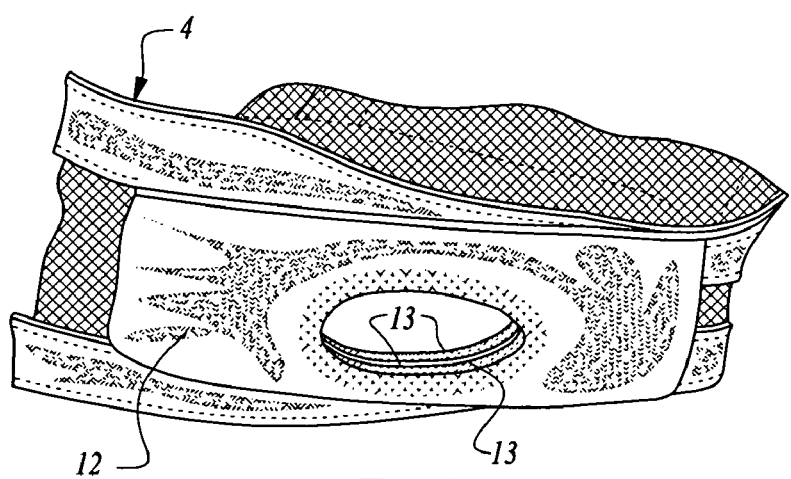
FIG. 4 is an enlarged perspective view illustrating details of closure structure at the attaching point of a lead rope and attendant hardware as illustrated in FIG. 3.
Figure 5:
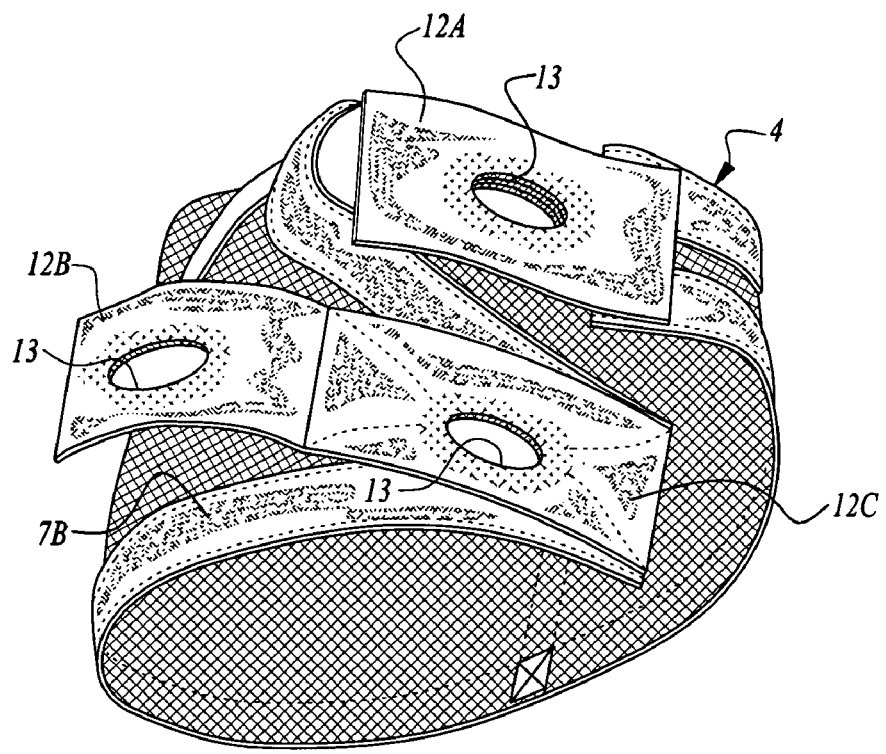
FIG. 5 is an enlarged perspective view illustrating layers of hook and loop fastener material of the closure structure separated to show openings therein.
Figure 6:
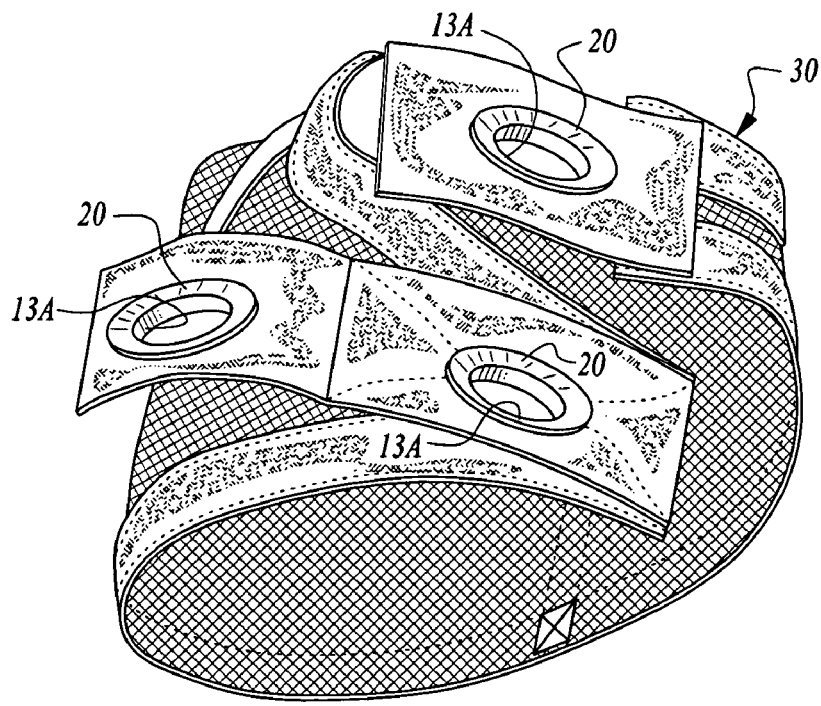
FIG. 6 is a view similar to FIG. 5, but illustrating an alternative embodiment of the invention wherein grommets define the openings.

The halter includes a closure 12 for positioning about the animal's neck for maintaining the cap in position on the animal's head. The closure 12 extends between spaced ends of strapping band 7B of the halter and includes three overlapping, selectively separable layers 12A, 12B and 12C (see FIG. 5) of synthetic hook and loop fastener material of known type. The layers define openings 13 which have an oblong configuration and which are in either partial or full registry when the layers are attached together as shown for example in FIGS. 2-4. The openings are essentially in the form of elongated, sewn button holes. FIG. 5 shows the layers separated to further illustrate this feature. FIG. 6 illustrates an alternative apparatus 30 wherein oval grommets 20 are employed to form the holes or openings 13A.

The closure 12 is for the purpose of attaching a lead rope 14 to the halter as well as maintaining the protective mask and halter apparatus in place on the head of the horse. FIG. 3 illustrates the lead rope 14 connected to the closure by conventional hardware in the form of a snap fastener 15 which extends through all three of the holes which are either in full or partial registry. The selectively separable layers 12A-12C provide a measure of adjustability to personalize the fit of the apparatus on the horse. It is also to be understood that the protective mask and halter apparatus may be made in different sizes to conform to different sized horses. The three layers of the closure provide the protective mask and halter apparatus with the strength it needs to function as a catch halter.

From the foregoing, it will be appreciated that although embodiments of the invention have been described herein for purposes of illustration, various modifications may be made without deviating from the spirit of the invention. Thus, the present invention is not limited to the embodiments described herein, but rather is defined by the following claims.

The invention claimed is:

1. Protective mask and halter apparatus for protecting the head and eyes of a horse or other animal from insects and the sun and for capturing and controlling the animal, said apparatus comprising, in combination:
    a cap formed of see-through mesh material shaped for positioning on the animal's head; and
    a halter including strapping attached to the cap and a closure for positioning about the animal's neck for maintaining said cap in position on the animal's head, said strapping and said cap sewn or otherwise permanently secured together to stabilize and minimize shifting of said cap on the animal's head while providing the additional strength necessary for the apparatus to function both as a catch halter and as a mask, said closure comprising a plurality of overlapping, selectively separable layers of hook and loop fastener material extending from said strapping and defining openings positionable in partial or full registry for jointly receiving lead rope connector hardware.

2. The apparatus according to claim 1 wherein the see through mesh material of said cap is colored and marked to conform to typical animal color and marking and includes a face panel bearing said marking.

3. The apparatus according to claim 2 wherein said strapping has the configuration of a conventional strap halter, said strapping including a band sewn to and extending across an area of the mesh material positionable over the cheeks of the animal whereby the overall appearance of the apparatus is similar to the appearance of an animal wearing a conventional separate halter.

4. The apparatus according to claim 1 wherein at least one of said openings has an oblong configuration.

5. The apparatus according to claim 4 wherein said openings are defined by grommets.

6. The apparatus according to claim 4 wherein said layers of hook and loop fastener material are selectively relatively adjustable and cooperable with said strapping to provide an adjustable neck opening for receiving the animal's neck.

7. The apparatus according to claim 1 wherein said strapping is fixedly attached to and extends along outer edges of said mesh material.

8. Protective mask and halter apparatus for protecting the head and eyes of a horse or other animal from insects and the sun and for capturing and controlling the animal, said apparatus comprising, in combination:
    a cap formed of see-through mesh material shaped for positioning on the animal's head; and
    a halter including strapping attached to the cap and a closure for positioning about the animal's neck for maintaining said cap in position on the animal's head, said closure comprising at least three overlapping, selectively separable layers of hook and loop fastener material defining openings in partial or full registry for jointly receiving lead rope connector hardware.

* * * * *